(12) United States Patent
Hayakawa (10) Patent No.: US 12,073,739 B2
(45) Date of Patent: Aug. 27, 2024

(54) VIDEO DISPLAY DEVICE

(71) Applicant: SEGA FAVE CORPORATION, Tokyo (JP)

(72) Inventor: Tetsuya Hayakawa, Tokyo (JP)

(73) Assignee: SEGA FAVE CORPORATION, Tokyo (JP)

( * ) Notice: Subject to any disclaimer, the term of this patent is extended or adjusted under 35 U.S.C. 154(b) by 0 days.

(21) Appl. No.: 18/039,529

(22) PCT Filed: Jan. 13, 2022

(86) PCT No.: PCT/JP2022/000882
§ 371 (c)(1),
(2) Date: May 31, 2023

(87) PCT Pub. No.: WO2022/158364
PCT Pub. Date: Jul. 28, 2022

(65) Prior Publication Data
US 2023/0419863 A1    Dec. 28, 2023

(30) Foreign Application Priority Data

Jan. 19, 2021  (JP) ................................ 2021-006637

(51) Int. Cl.
*G09B 27/00*    (2006.01)
*F21V 9/40*     (2018.01)
(Continued)

(52) U.S. Cl.
CPC ................ *G09B 27/00* (2013.01); *F21V 9/40* (2018.02); *F21V 11/14* (2013.01); *F21V 13/02* (2013.01);
(Continued)

(58) Field of Classification Search
CPC .......... G09B 27/00; G09B 5/02; G09B 27/04; G09B 27/06; F21W 2121/008; F21V 9/40;
(Continued)

(56) References Cited

U.S. PATENT DOCUMENTS 6,769,778 B1    8/2004  Lloyd
2009/0122548 A1*  5/2009  Dalsgaard ............. F21V 17/002
                                                        362/282
(Continued)

FOREIGN PATENT DOCUMENTS

CN    205880385 U  *  1/2017
CN    111734978 A  *  10/2020
(Continued)

OTHER PUBLICATIONS

International Search Report issued Feb. 22, 2022 in International (PCT) Application No. PCT/JP2022/000882.

*Primary Examiner* — Erin Kryukova
(74) *Attorney, Agent, or Firm* — Wenderoth, Lind & Ponack, L.L.P.

(57) ABSTRACT

The present invention addresses the problem of providing a video display device that projects and displays video including starry sky images onto a target surface, that can reproduce the twinkling of stars and that can more faithfully reproduce an actual starry sky. Provided are a light source, a projection lens, a starry-sky projection negative plate, a twinkling negative plate with uneven light-transmitting properties, a starry-sky-end support unit that supports the starry-sky projection negative plate in a location onto which light from the light source is radiated, a twinkling-end support unit that supports the twinkling negative plate between the starry-sky projection negative plate and the projection lens or between the light source and the starry-sky projection negative plate, and an actuation mechanism that
(Continued)

rotationally actuates, by power from an actuator, the starry-sky projection negative plate in a state of being supported by the starry-sky-end support unit and the twinkling negative plate in a state of being supported by the twinkling-end support unit. Light that has penetrated the starry-sky projection negative plate and the twinkling negative plate is radiated onto the target surface via the projection lens.

6 Claims, 11 Drawing Sheets

(51) Int. Cl.
- *F21V 11/14* (2006.01)
- *F21V 13/02* (2006.01)
- *F21V 14/08* (2006.01)
- *F21W 121/00* (2006.01)

(52) U.S. Cl.
CPC ....... *F21V 14/08* (2013.01); *F21W 2121/008* (2013.01)

(58) Field of Classification Search
CPC .......... F21V 11/14; F21V 13/02; F21V 14/08; G03B 23/08; G03B 23/10; G03B 23/105; G03B 23/06

See application file for complete search history.

(56) References Cited

U.S. PATENT DOCUMENTS

| | | | |
|---|---|---|---|
| 2018/0128448 A1* | 5/2018 | Chien | F21V 23/0442 |
| 2022/0099261 A1* | 3/2022 | Wei | F21V 21/30 |
| 2022/0404633 A1* | 12/2022 | Liu | F21S 10/007 |

FOREIGN PATENT DOCUMENTS

| | | |
|---|---|---|
| JP | 57-116382 | 7/1982 |
| JP | 3-108279 | 11/1991 |
| JP | 2005-201955 | 7/2005 |
| JP | 2016-186559 | 10/2016 |

\* cited by examiner

VIDEO DISPLAY DEVICE

TECHNICAL FIELD

This invention relates to a video display device that projects and displays video including starry sky images onto a target surface.

BACKGROUND ARTS

Conventionally, it is publicly known that there is a video display device that projects and displays video including starry sky images corresponding to a starry-sky projection negative plate onto a target surface by radiation of light having penetrated the starry-sky projection negative plate onto the target surface via a projection lens.

Further, a video display device equipped with an actuator that rotationally drives a twinkling negative plate having a light transmitting region and a light blocking region in a state where the twinkling negative plate is rotatably supported between a starry-sky projection negative plate and a projection lens or between a light source and the starry-sky projection negative plate has been developed and is being publicly known (Refer to a patent document 1 below, for instance).

According to the video display device as disclosed in the patent document 1, the phenomenon of the twinkling of stars can be reproduced in accordance with a change in light penetrating the twinkling negative plate by rotationally driving the twinkling negative plate by the actuator, whereas any movement of the stars cannot be reproduced because the starry-sky projection negative plate is not rotated, and consequently, there is still a problem for achievement of more real starry sky reproduction.

PRIOR ART DOCUMENT

Patent Document

Patent document 1: Japanese Patent Publication No. 4364652

SUMMARY OF THE INVENTION

Problems to be Solved by the Invention

An object of the present invention is to provide a video display device that projects and displays video including starry sky images onto a target surface, that can reproduce the twinkling of stars, and that can more faithfully reproduce an actual starry sky.

Means for Solving the Problems

To solve the above problem, the present invention provides a video display device that projects and displays video including starry sky images corresponding to a starry-sky projection negative plate onto a target surface by radiation of light having penetrated the starry-sky projection negative plate onto the target surface via a projection lens, and that comprises a light source, the projection lens, the starry-sky projection negative plate, a twinkling negative plate with uneven light-transmitting properties, a starry-sky-end support unit that supports the starry-sky projection negative plate in a location onto which light from the light source is radiated, a twinkling-end support unit that supports the twinkling negative plate between the starry-sky projection negative plate and the projection lens or between the light source and the starry-sky projection negative plate, and an actuation mechanism that includes an actuator, and rotationally actuates, by power from the actuator, the starry-sky projection negative plate in a state of being supported by the starry-sky-end support unit and the twinkling negative plate in a state of being supported by the twinkling-end support unit.

The video display device may have a single support member formed with the starry-sky-end support unit and the twinkling-end support unit.

The support member may be in the form of a placing tray that positions, places and supports the starry-sky projection negative plate and the twinkling negative plate.

The placing tray may be structured so as to place the starry-sky projection negative plate and the twinkling negative plate in a stacked state to be in contact with or adjacent to each other.

The video display device may have a casing with the light source and the actuation mechanism housed therein, wherein the placing tray may be stored in the casing in an extractable manner.

The actuation mechanism may have a single actuator and a transmission mechanism that transmits power from the actuator, wherein a starry-sky-end rotation driving unit that rotationally drives the starry-sky projection negative plate and a twinkling-end rotation driving unit that rotationally drives the twinkling negative plate may be individually installed on a power transmission path in the transmission mechanism.

The actuation mechanism may be structured so as to rotate the starry-sky projection negative plate and the twinkling negative plate at mutually different angular velocities or in mutually different directions.

The actuation mechanism may be structured so that a rotation axis of the twinkling negative plate is made positioned on the same axis as that of the starry-sky projection negative plate.

Effects of the Invention

The phenomenon of the movement of stars in a starry sky as well as the phenomenon of the twinkling of the stars can be reproduced by rotating both of the starry-sky projection negative plate and the twinkling negative plate, thereby resulting in allowing to more faithfully reproduce an actual starry sky.

MODE FOR EMBODYING THE INVENTION

Figure 1:
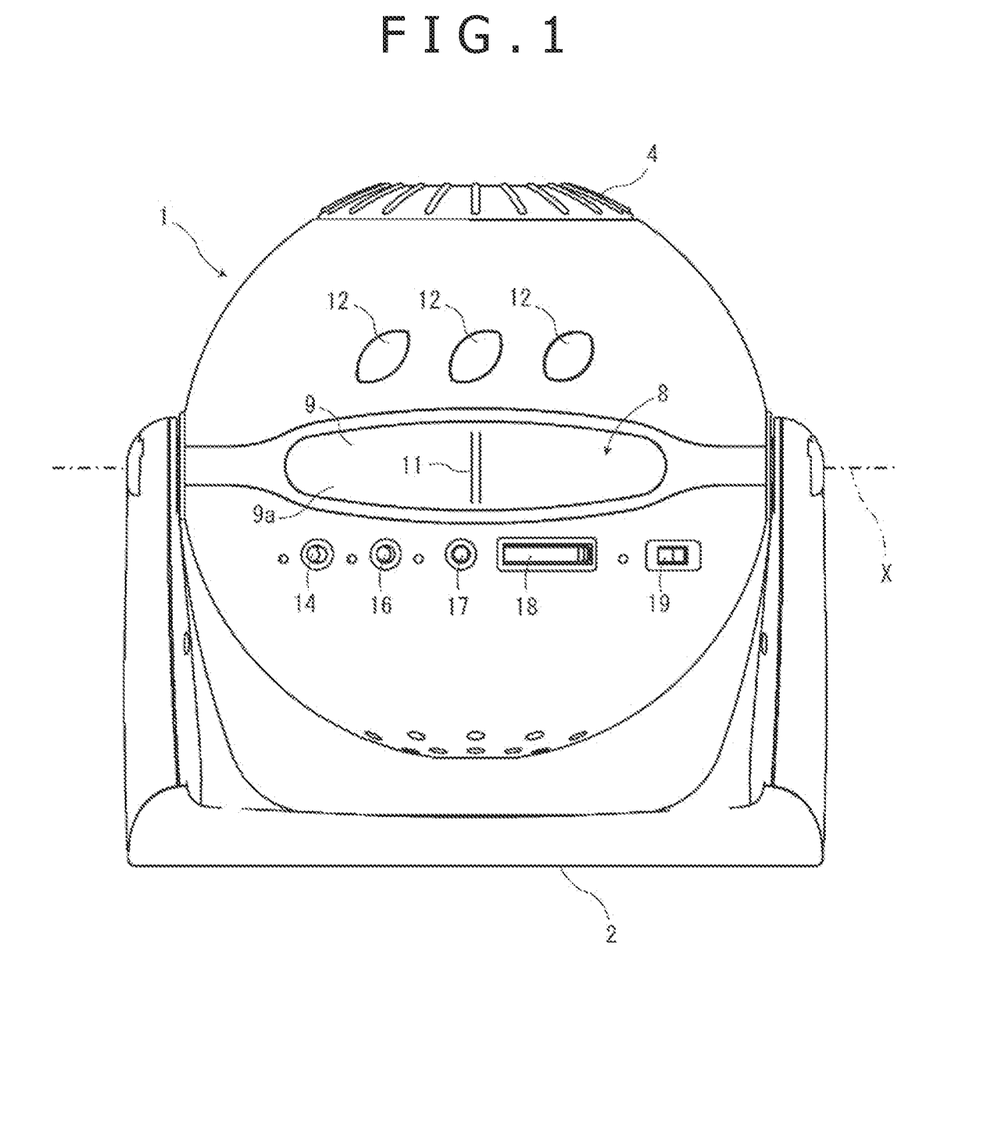
FIG. 1 is a front view showing a video display device to which the present invention is applied.
Figure 2:
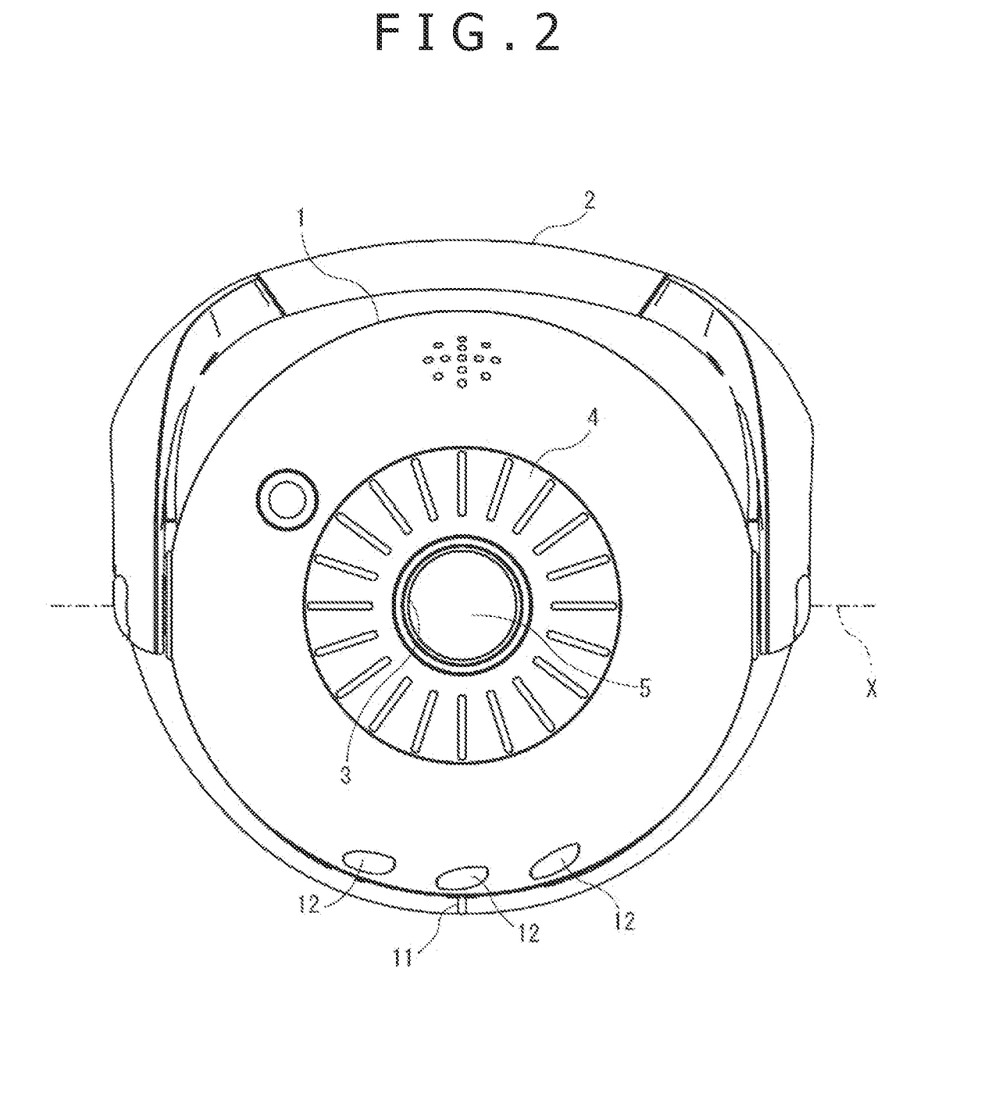
FIG. 2 is a plan view showing the video display device to which the present invention is applied.
Figure 3:
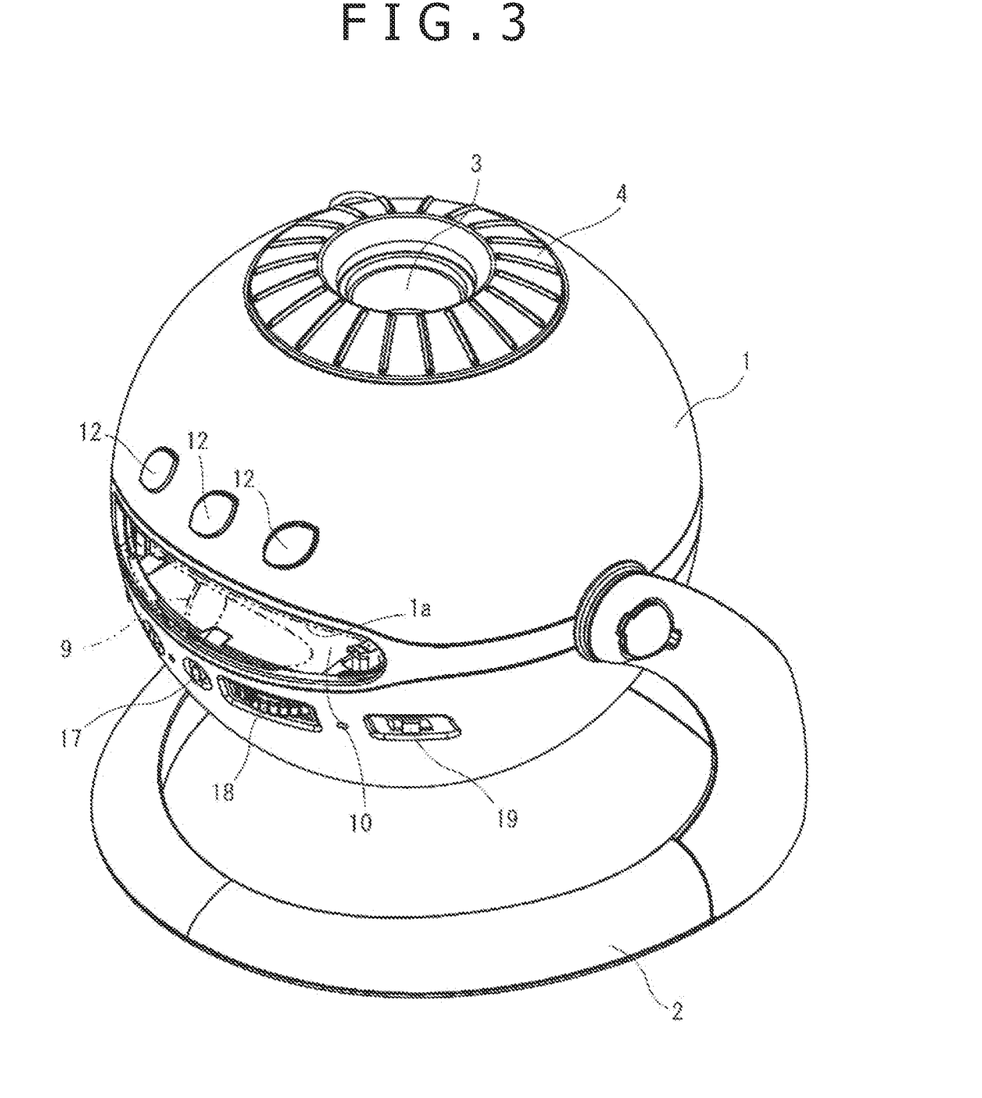
FIG. 3 is a perspective view showing the video display device with a placing tray removed therefrom.

FIGS. 1 and 2 are a front view and a plan view respectively showing a video display device to which the present invention is applied, and FIG. 3 is a perspective view showing the video display device with a placing tray removed therefrom. This video display device has a synthetic resin-made casing 1 formed in a spherical shape, and a synthetic resin-made support stand 2 that supports the casing 1 from its lower side in a vertically swingable manner, with a horizontal axis X, or a virtual axis extending in a lateral direction through the center or its nearby position of the casing, as a fulcrum.

The casing 1 has, at its top, a vertical light-radiation hole 3 in a recessed shape with an open top. A projection lens 5 is installed inside the radiation hole 3. Light with its optical axis directed toward an axial direction of the radiation hole 3 passes through the projection lens 5, followed by being led out of an open top end part of the radiation hole 3 toward the outside of the casing 1. The light having been led out of the radiation hole 3 is radiated onto a flat target surface M (see FIG. 11). Accordingly, video (or video composed of starry sky images in the present embodiment) at least partly including a given starry sky image can be projected onto the target surface M. Namely, the light having passed through the projection lens 5 is subjected to a radiation angle adjustment by a vertical swinging motion of the casing 1 with the above horizontal axis X as the fulcrum.

And, a position of the casing 1 when being in a state where a radiation direction of the light having been led out of the radiation hole 3 with its open top end situated at the top of the casing 1 is directed right upward can be a basic position of the casing 1. Hereinafter, it is to be noted that the casing 1 shall be held in the basic position, insofar as there is no particular remark otherwise stated.

The casing 1 has, on its top side surface part, a circular ring-shaped adjusting dial 4 arranged so as to surround the periphery of an opening part of the radiation hole 3. The adjusting dial 4 is structured so as to be made operable rotationally with its center as a furculum. By the operation of rotating the adjusting dial 4, it is made possible to perform a focus adjustment for the projected video (or starry sky images) on the target surface M in the occurrence of defocusing of the projected video and/or a size adjustment for the projected video (or starry sky images) on the target surface M.

The inside of the casing 1 is formed with a storage space 10 (see FIG. 3) in which a synthetic resin-made placing tray (or a support member) 8 for positioning and placing of negative plates 6 and 7 (see FIGS. 4 to 9) can be stored. The storage space 10 is configured so as to have an open front constituted by an insertion opening 1a formed in the front of the casing 1. Therefore, the placing tray 8 can be stored in the storage space 10 by being inserted thereinto via the insertion opening 1a in an extractable manner.

In a state where the placing tray 8 is stored in the storage space 10 by being inserted thereinto to the maximum, the insertion opening 1a is closed by a closing lid 9 integrally formed on an outermost end part (or a rear end part) of the placing tray 8. When the insertion opening 1a is being in a closed state, an outside surface of the closing lid 9 or an exposure-side surface exposed to the outside of the closing lid 9 constitutes a part of an outside surface of the casing 1. The closing lid 9 has, on its exposure-side surface part exposed to the outside thereof, a recessed part 9a formed in the shape of being recessed toward an insertion direction, and a grip 11 integrally formed in the shape of projecting forwards from the recessed part 9a. Thus, smooth work for inserting/extracting the placing tray 8 into/from the storage space 10 can be performed by holding the grip 11.

The casing 1 has, on its front surface part situated at a more upward position than the closing lid 9, a plurality of operation buttons 12, 12 and 12 arranged in lateral juxtaposition. Each operation button 12 is a pushing-operable momentary type switch. By selecting one or more operation buttons 12 to be operated among the plurality of operation buttons 12, 12 and 12, the appropriate selection of a sound (specifically, a musical piece) to be outputted from a speaker 13 (see FIG. 11) housed in the casing 1 is performed. Meanwhile, by doing a long push of the operation button 12, sound output from the speaker 13 is stopped.

The casing 1 also has, on its front surface part situated at a more downward position than the closing lid 9, a plurality of operation buttons 14, 16 and 17, a rotation-operable adjusting dial 18 and a power switch 19 arranged in lateral juxtaposition.

Each of the operation buttons 14, 16 and 17 is a momentary type switch.

More specifically, the operation button 14 is a timer switch capable of setting an operation time or a duration that the starry sky images are to be projected onto the target surface M, wherein such operation time is made selectable from among 15 mins, 30 mins and 60 mins, for instance. The operation may be stopped in accordance with the passage of a given time (or three hours, for instance) even when the timer is in an OFF state.

The operation button 16 is to make switching as to whether or not to set a random mode for performing projection of the starry sky images onto the target surface M at random time zones. The operation button 17 is to make switching as to whether or not to set a revolving movement mode for projecting the starry sky images showing that the stars are revolving clockwise or counterclockwise at a given cycle (or 12 mins, for instance). It is to be noted that the operation buttons 14 and 16 other than the operation button 17 may also be applied to a speed adjustment for the revolving speed of the stars, while the revolving movement mode is being set.

The adjusting dial 18 is rotationally operated to make a volume adjustment for the sound to be outputted from the speaker 13.

The power switch 19 is a seesaw switch turned on/off to make switching as to whether or not to perform a power supply. It is to be noted that the power supply may also be received from a battery housed in the casing 1, or alternatively, from an external power source via an adapter or the like, and in the present embodiment, the power supply in the latter is adopted.

Next will be detailed the structure of the placing tray 8 together with the structure of an actuation mechanism 21 that rotationally actuates the negative plates 6 and 7, with reference to FIGS. 4 to 9.

Figure 4:
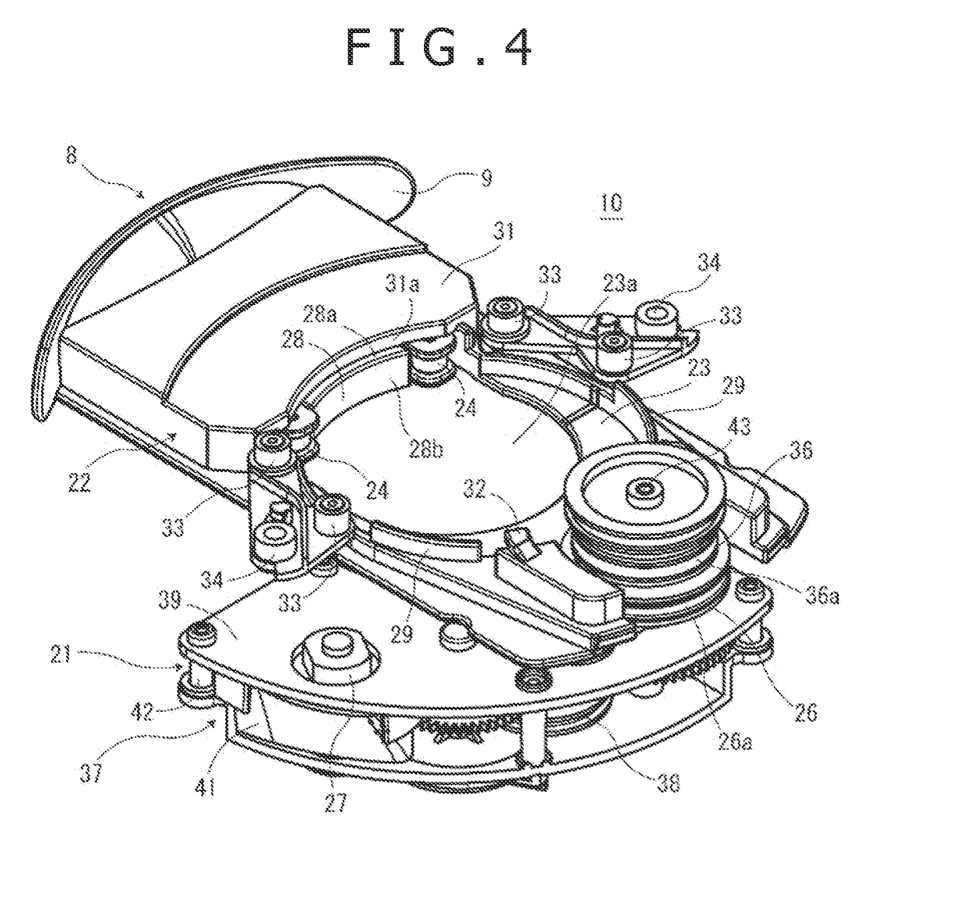
FIG. 4 is a perspective view showing a placing tray structure together with an actuation mechanism structure.
Figure 5:
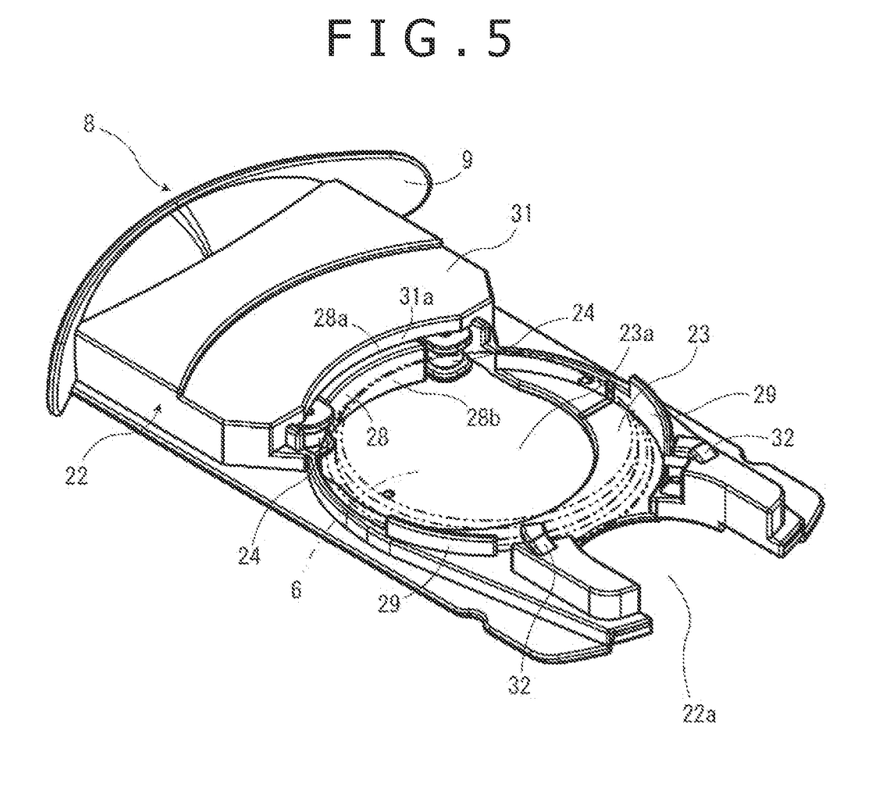
FIG. 5 is a perspective view showing a state in which a lower negative plate is positioned and placed on the placing tray.

FIG. 4 is a perspective view showing a placing tray structure together with an actuation mechanism structure, and FIG. 5 is a perspective view showing a state in which a lower negative plate is positioned and placed on the placing tray. The placing tray 8 has, as an integral unit, the above closing lid 9 and a tray body 22 that is to be stored in the storage space 10 by being completely inserted thereinto.

The tray body 22 has a downwardly recessed part 23 formed in a circular shape in plan view, wherein a flat bottom of the recessed part 23 is bored with an exposure hole 23a. A twinkling negative plate 6 or one negative plate formed in a disk shape is stored in the recessed part 23 so as to be fitted or approximately fitted thereto. In other words, the negative plate 6 is placed and positioned on the flat bottom of the recessed part 23 in a state where the movement of the negative plate to four directions is regulated by an inner circumferential surface of the recessed part 23. That is to say, the recessed part 23 functions as a twinkling-end support unit that supports the twinkling negative plate 6. It is to be noted that the exposure hole 23a is to expose, to the side right beneath the tray body 22, the negative plate 6 being positioned and stored in the recessed part 23.

There are provided right and left abutting rollers 24 and 24 in a freely rotating state respectively at the right and left symmetrical positions in a part (or a front side part) close to the side of a direction (or an extraction direction side) opposite to an insertion direction in a circumferential wall of the recessed part 23. The right and left abutting rollers 24 and 24 are supported by the tray body 22 movably forward and backward with respect to the recessed part 23, resulting in these abutting rollers being elastically energized toward the insertion direction or a recessed part 23-side by an elastic member (not shown). By so doing, each of the abutting rollers 24 and 24 is elastically abutted, in a freely rotatable manner, on the negative plate 6 being positioned and stored in the recessed part 23.

Besides, an insertion direction side part (or a rear side part) in the tray body 22 is formed into a cutout part of a circular arc shape, so that a resultant space in the cutout part constitutes a driving space 22a. A part of an outer circumferential edge of the negative plate 6 being positioned and stored in the recessed part 23 faces the driving space 22a, and is then abutted on a driving roller (or a twinkling-end rotation driving unit) 26 that constitutes a part of the actuation mechanism 21 and that is being supported in the driving space 22a in a rotationally drivable manner.

The driving roller 26 and the right and left abutting rollers 24 and 24 are respectively arranged on one and the other of the front and rear sides interposing the center of the negative plate being positioned and stored in the recessed part 23, so as to elastically hold the negative plate 6 from the front and rear sides. Therefore, in this state, the negative plate 6 is rotationally driven in a smooth manner with its own center as the fulcrum only by rotationally driving the driving roller 26 by an electric motor (or an actuator) 27 that constitutes a part of the actuation mechanism 21.

Figure 6:
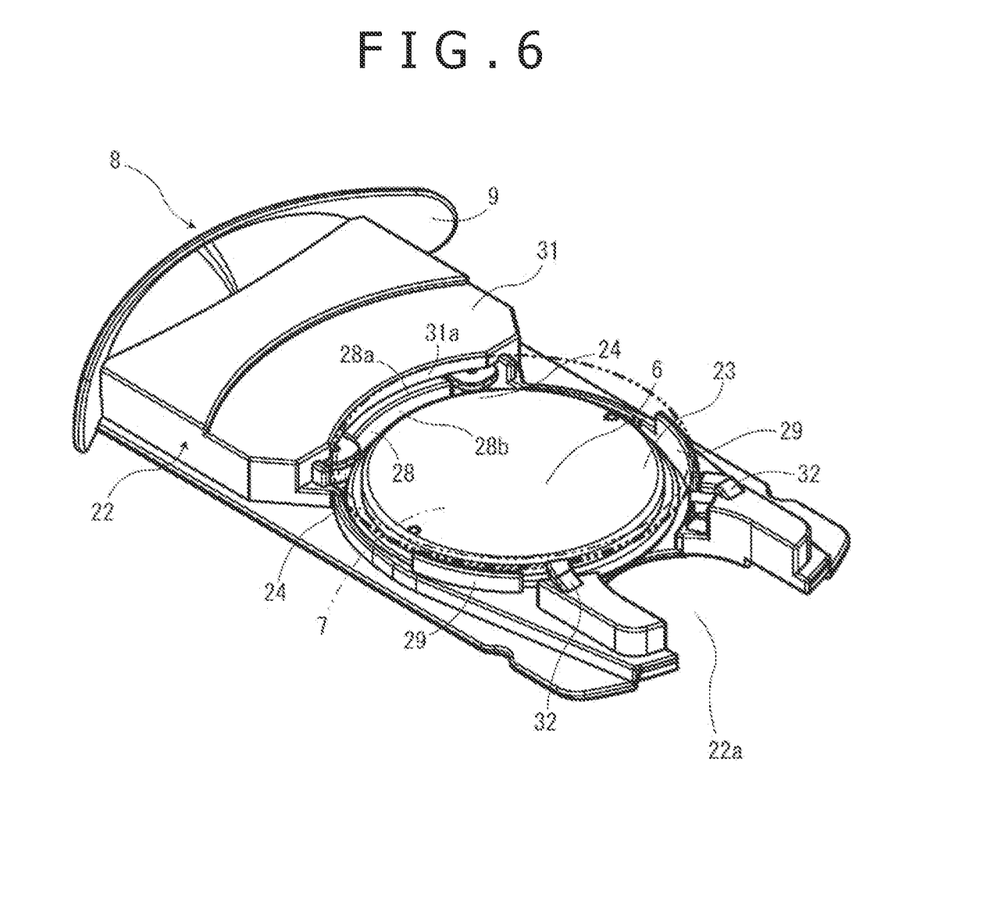
FIG. 6 is a perspective view showing a state in which an upper negative plate is further positioned and placed on the placing tray with the lower negative plate already positioned and placed thereon.

FIG. 6 is a perspective view showing a state in which an upper negative plate is further positioned and placed on the placing tray with the lower negative plate already positioned and placed thereon. As shown in FIGS. 4 and 6, a stellar negative plate (or a starry-sky projection negative plate) 7 or a negative plate other than the twinkling negative plate 6 is positioned and placed on the placing tray 8 in a location right above the twinkling negative plate 6 in a mutually contact or adjacent state. In other words, the two negative plates 6 and 7 are respectively positioned and placed on the placing tray 8 so as to be in contact with or adjacent to each other (namely, in a stacked state).

For actualization of the above, the tray body 22 is integrally formed with three or more placing parts 28, 29 and 29 (the number of placing parts is three in the present embodiment) along the inner circumferential surface of the recessed part 23.

More specifically, the placing part 28 is an outer-side placing part integrally extended in the insertion direction from an outer side part 31 or the extraction direction side part of the tray body 22 so as to be situated between the right and left abutting rollers 24 and 24. An upper surface of the outer-side placing part 28 forms a placing surface 28a on which the negative plate 7 is to be placed. It is to be noted that an extended end surface 28b of the outer-side placing part 28 is in the form of a circular arc surface recessed toward the extraction direction, and constitutes a part of the inner circumferential surface of the recessed part 23.

The placing surface 28a is formed in the position lower than the upper surface position of the outer-side part 31 by one step, and accordingly, an insertion direction-side end surface 31a of the outer side part 31 constitutes a regulation surface that is continuously rising in a vertical direction from the placing surface 28a. The regulation surface 31a is formed in a circular-arc concave curved shape along the end surface 28b in plan view.

The other placing parts 29 and 29 are inner-side placing parts respectively formed at the right and left symmetrical positions on the side opposite to the outer-side placing part 28, with the recessed part 23 in between. Each of the right and left inner-side placing parts 29 and 29 is formed in a circular-arc curved shape along the inner circumferential surface of the recessed part 23 in plan view. Each upper end of the right and left inner-side placing parts 29 and 29 is situated on the same plane as the above placing surface 28a.

And then, the negative plate 7 is supported from its undersurface side by the three placing parts 28, 29 and 29. The regulation surface 31a regulates (or disables) the movement of the thus supported negative plate 7 when moved on the surface of the tray body 22 toward the extraction direction.

Meanwhile, when the negative plate 7 being supported from its undersurface side by the three placing parts 28, 29 and 29 is moved on the surface of the tray body 22 toward the insertion direction, such movement thereof is regulated by a pair of right and left regulation parts 32 and 32. Each of the right and left regulation parts 32 and 32 is in the form of a claw-shaped part being projecting obliquely upwards in the extraction direction from each of the right and left positions close to the driving space 22a in plan view in regards to the tray body 22. With the above structure, the right and left regulation parts 32 and 32 are supposed to also regulate the upward movement of the negative plate 7 being supported from its undersurface side by the three placing parts 28, 29 and 29, as well as the movement thereof when moved on the surface of the tray body 22 toward the insertion direction.

Namely, the front-side placing part 28, the rear-side right and left placing parts 29 and 29, the front-side regulation surface 31a and the rear-side right and left regulation parts 32 and 32 are functioning as a starry-sky-end support unit that supports the stellar negative plate 7.

In this way, abutting rollers 33, 33, 33 and 33 in a freely rotating state are elastically abutted, from the lateral sides thereof, on the respective right and left parts close to the closing lid 9 in an outer circumferential edge of the negative plate 7 being positioned and placed on the tray body 22.

Referring to a specific structure, a pair of right and left support arms 34 and 34 are respectively supported on the casing 1-side in a laterally swingable manner. Each support arm 34 is provided with a plurality of abutting rollers 33 and 33 in the freely rotating state. The right and left support arms 34 and 34 are respectively arranged at right and left symmetrical positions on the extraction direction side (or the front side) of the outer circumferential edge of the negative plate 7 being positioned and placed by the starry-sky-end support unit, resulting in these support arms being elastically energized toward the negative plate 7-side by an elastic member (not shown). Then, the negative plate 7 comes to be in a state of being elastically held from both the right and left sides of the front by the abutting rollers 33 and 33 being supported by one of the right and left arms 34 and 34 and also by the abutting rollers 33 and 33 being supported by the other thereof.

Like the above negative plate 6, a part of the outer circumferential edge of the negative plate 7 also faces the driving space 22a, and is then elastically abutted on a driving roller (or a starry-sky-end rotation driving unit) 36 that is being supported in the driving space 22a in a rotationally drivable manner and that constitutes a part of the actuation mechanism 21.

Namely, as to the negative plate 7 being positioned and placed by the starry-sky-end support unit, the positioning of such negative plate 7 is performed in a rotatable state by not only the abutting rollers 33 and 33 on one of the right and left sides of the front and the abutting rollers 33 and 33 on the other thereof but also the driving roller 36 on the rear side. Thus, in this state, the negative plate 7 is rotationally driven in a smooth manner with its own center as the fulcrum only by rotationally driving the driving roller 36 by the electric motor (or the actuator) 27.

It is to be noted that the center of the lower negative plate 6 and that of the upper negative plate 7 are situated at the same or approximately same position in plan view. Namely, the two negative plates 6 and 7 are structured so as to be made rotatable with the same virtual rotation axis Z (see FIG. 9) passing through their own centers, as the fulcrum. Besides, with consideration of the above support structure, the upper negative plate 7 is set to be larger in diameter than the lower negative plate 6.

Figure 7:
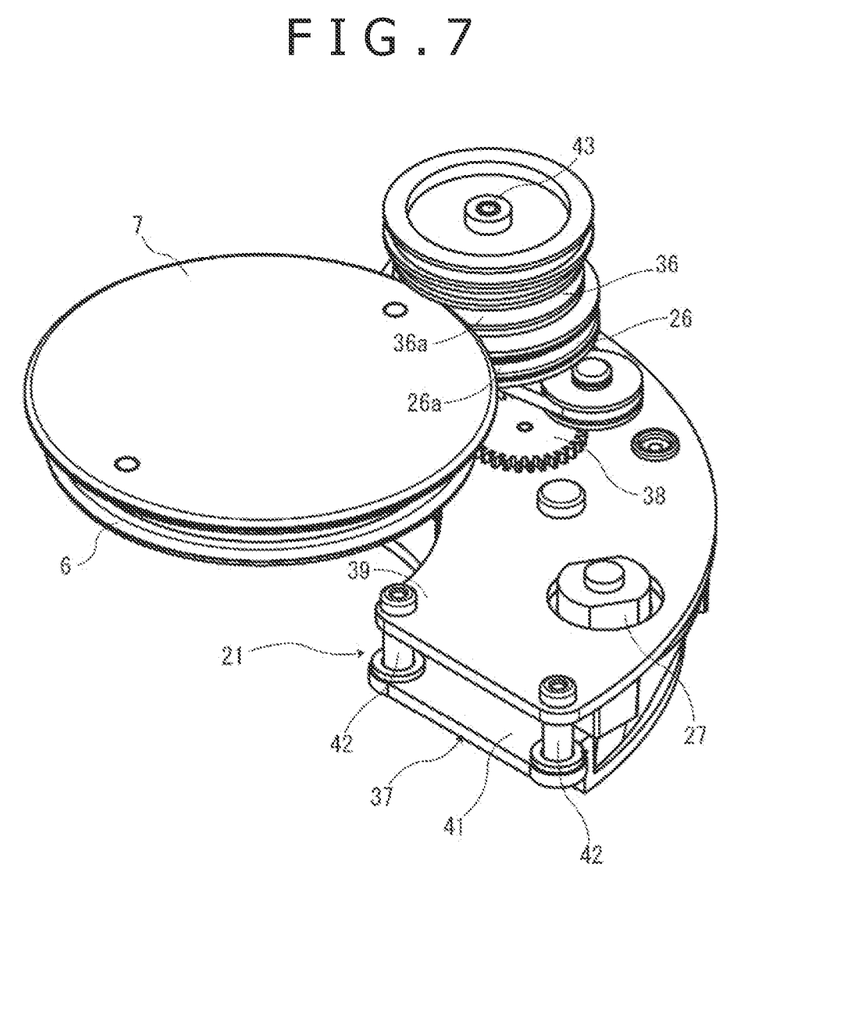
FIG. 7 is a perspective view showing the structure of two negative plates together with the actuation mechanism structure.
Figure 8:
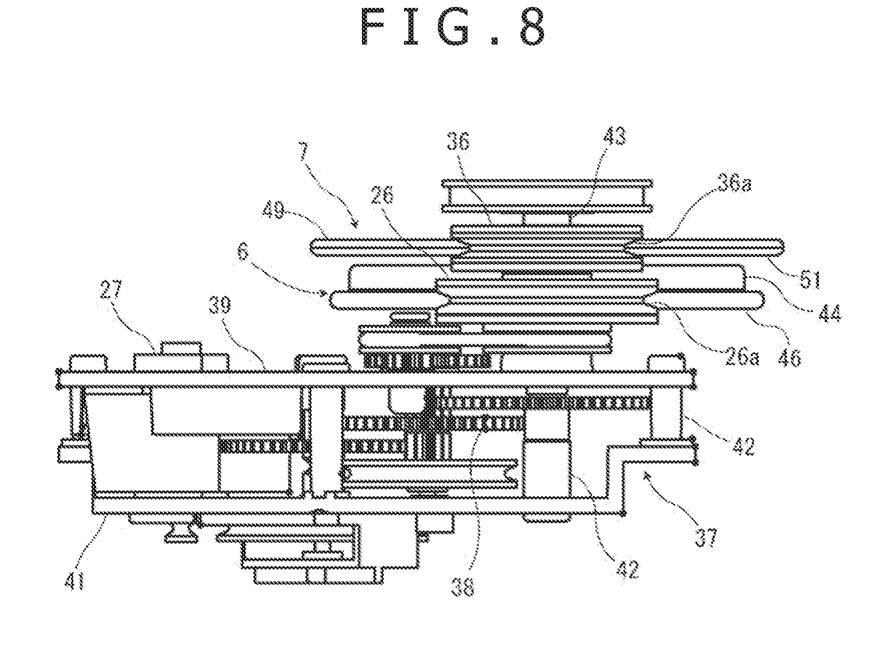
FIG. 8 is a rear elevation showing the structure of the two negative plates together with the actuation mechanism structure.
Figure 9:
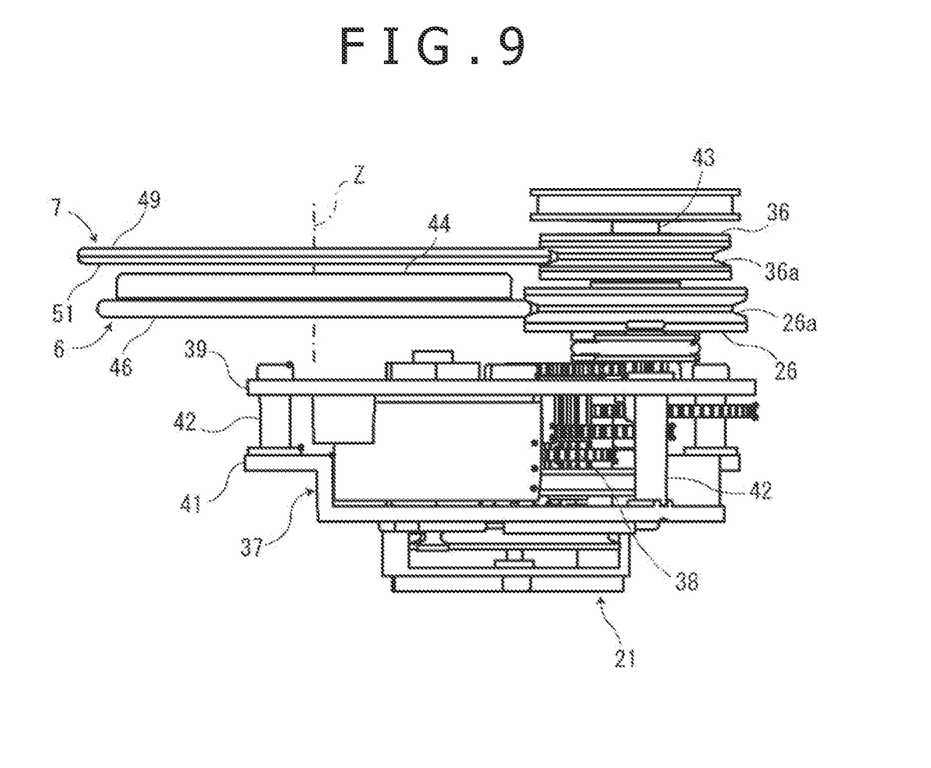
FIG. 9 is a side elevation showing the structure of the two negative plates together with the actuation mechanism structure.

FIGS. 7 to 9 are a perspective view, a rear elevation and a side elevation respectively showing the structure of two negative plates together with the actuation mechanism structure. As shown in FIGS. 4 and 7 to 9, the actuation mechanism 21 has an actuation-side frame 37 that is fixed to the casing 1-side so as to be situated right beneath the insertion direction side part in the tray body 22 of the placing tray 8 when in a stored state and that functions as a housing, the single electric motor 27 mounted and supported on the actuation-side frame 37, the two driving rollers 26 and 36, and a transmission mechanism 38 supported on the actuating-side frame 37-side.

The actuation-side frame 37 has a pair of upper and lower plates 39 and 41 arranged opposite to each other in parallel, and a plurality of spacers 42 that holds the spacing between the upper and lower plates 39 and 41.

A part of the actuation-side frame 37 is situated right beneath the driving space 22a, and at this part, there is provided a vertical driving shaft 43 arranged in parallel with the rotation axis Z. The driving shaft 43 is supported between the upper and lower plates 39 and 41 so as to be made rotatable about the axis of the driving shaft, and a part of the driving shaft is projecting upwards from the upper plate 39 to form a part that faces the driving space 22a-side, wherein the two rollers 26 and 36 are detachably mounted and fixed to this projecting part of the driving shaft. Namely, the two driving rollers 26 and 36 are rotationally driven, as one body, with the driving shaft 43 or the same axis as the fulcrum.

The electric motor 27 is detachably fixed in a state where the body of the electric motor 27 is inserted between the upper and lower plates 39 and 41, with an electric motor output shaft (not shown) directed downwards.

The transmission mechanism 38 is constituted of gear, belt, pulley and rotation shaft or like various transmission members that transmit rotation power to the driving shaft 43 through the output shaft of the electric motor 27. Then, the two driving rollers 26 and 36 receive the rotation power transmitted in a decelerated state from the electric motor 27 via the transmission mechanism 38, and thereby rotationally drive the negative plates 6 and 7.

The driving rollers 26 and 36 respectively have, on their outer circumferential parts, recessed grooves 26a and 36a of V shape into which the outer circumferential edge-side parts of the negative plates 6 and 7 are respectively inserted, thereby allowing the negative plates 6 and 7 to firmly abut on the driving rollers 26 and 36, resulting in allowing to surely perform the rotational driving of the negative plates 6 and 7 by the driving rollers 26 and 36.

Meanwhile, the driving roller 26 that rotationally drives the lower negative plate 6 in a direct manner is set to be larger in diameter than the driving roller 36 that rotationally drives the upper negative plate 7 in a direct manner, because of the fact that the lower negative plate 6 is set to be smaller in diameter than the upper negative plate 7, that the upper and lower negative plates 6 and 7 are rotated about the rotation axis Z or the same axis, and that the two driving rollers 26 and 36 are also rotated with the driving shaft 43 or the same axis as the fulcrum. According to a difference in diameter between these driving rollers, the lower negative plate 6 is set to be higher in angular velocity than the upper negative plate 7, when rotating the upper and lower negative plates 6 and 7 by the electric motor 27.

In this way, the actuation mechanism 21 allows each angular velocity (or each rotational speed) of the upper and lower negative plates 6 and 7 to be set to mutually different values. Specifically, in the present embodiment, the twinkling negative plate 6 is subjected to rotation at a shorter period (or a higher speed) than the period of the stellar negative plate 7.

Next will be described the structure of the two negative plates 6 and 7 together with a rotation control method thereof with reference to FIGS. 4 and 8 to 11.

Figure 10:
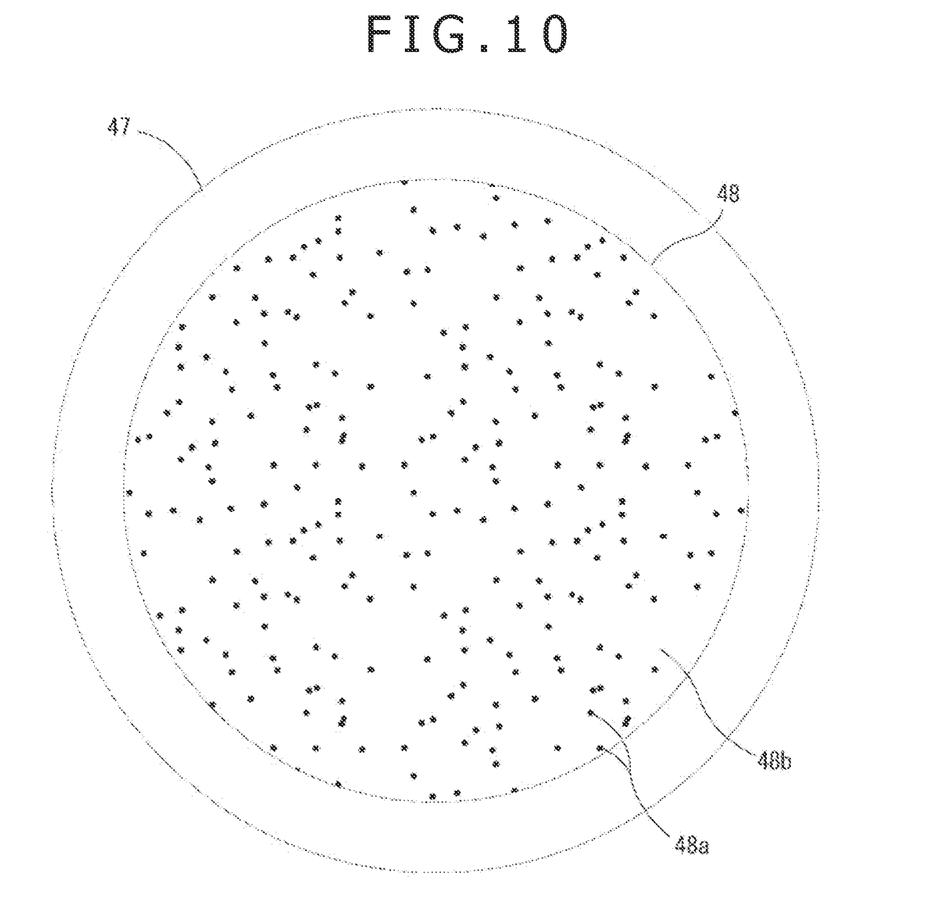
FIG. 10 is a plan view showing a twinkling negative plate body structure.

FIG. 10 is a plan view showing a twinkling negative plate body structure. As shown in FIGS. 8, 9 and 10, the twinkling negative plate 6 has a structure obtained by detachably joining and fixing the outer circumferential edge-side part surfaces of a pair of upper and lower negative plate cases 44 and 46 respectively formed in the shape of a circular plate with high light-transmitting properties (specifically, a transparent circular plate) to each other so as to sandwich a negative plate body 47 between the upper and lower negative plate cases 44 and 46, and is formed in a disk-like shape on the whole. The two negative plate cases 44 and 46 have their centers at the same position as the center of the negative plate body 47 in plan view.

A most part of the negative plate body 47 is formed with a twinkling expression area 48 or a circular area having its center at the same position as the center of the negative plate body 47 and being uneven in light transmitting properties. The twinkling expression area 48 is composed of a light blocking region 48a or a dotted or circular region with high light-blocking properties and a light transmitting region 48b or a region (specifically, a transparent region) with low light-blocking properties. There are provided a large number of light blocking regions 48a within the twinkling expression area 48. The light transmitting region 48b can be a region in the twinkling expression area 48, excluding the light blocking regions therein.

As shown in FIGS. 8 and 9, like the twinkling negative plate 6, the stellar negative plate 7 also has a structure obtained by detachably joining and fixing the outer circumferential edge-side part surfaces of a pair of upper and lower negative plate cases 49 and 51 respectively formed in the shape of a circular plate with high light-transmitting properties (specifically, a transparent circular plate) to each other so as to sandwich a negative plate body (not shown) between the upper and lower negative plate cases 49 and 51, and is formed in a disk-like shape on the whole. The two negative plate cases 49 and 51 have their centers at the same position as the center of the negative plate body in plan view.

Briefly referring to a body structure of the stellar negative plate 7 instead of its detailed description because of a conventionally well-known structure, the body of the stellar negative plate 7 partially or wholly forms a circular starry-sky expression area that is composed of a material with high light-blocking properties or a material impenetrable to light and that has the same center as the center of the stellar negative plate. The starry-sky expression area is perforated with a large number of light transmitting holes in sizes according to the light intensities of the respective stars, in correspondence with a large number of stars included in the starry sky image.

The upper and lower negative plates 6 and 7 being rotatably supported on the recessed part 23-side of the tray body 22 come to be in agreement with each other on their expression areas 48 in plan view. When the stellar negative plate 7 is rotated, the hole parts thereof are moved on a circular locus with the center of the stellar negative plate as the fulcrum, thereby allowing the stars in the starry sky image to be moved, resulting in allowing to reproduce the movement of the stars in an actual starry sky. Meanwhile, when the twinkling negative plate 6 is rotated, the light blocking region 48a thereof passes through the hole parts perforated in the stellar negative plate 7 in plan view in the middle of the movement of the light blocking region 48a on the circular locus with the center of the twinkling negative plate as the fulcrum, thereby allowing a change in brightness of the stars in the starry sky image to occur, resulting in allowing to reproduce the twinkling of the stars in the actual starry sky.

Figure 11:
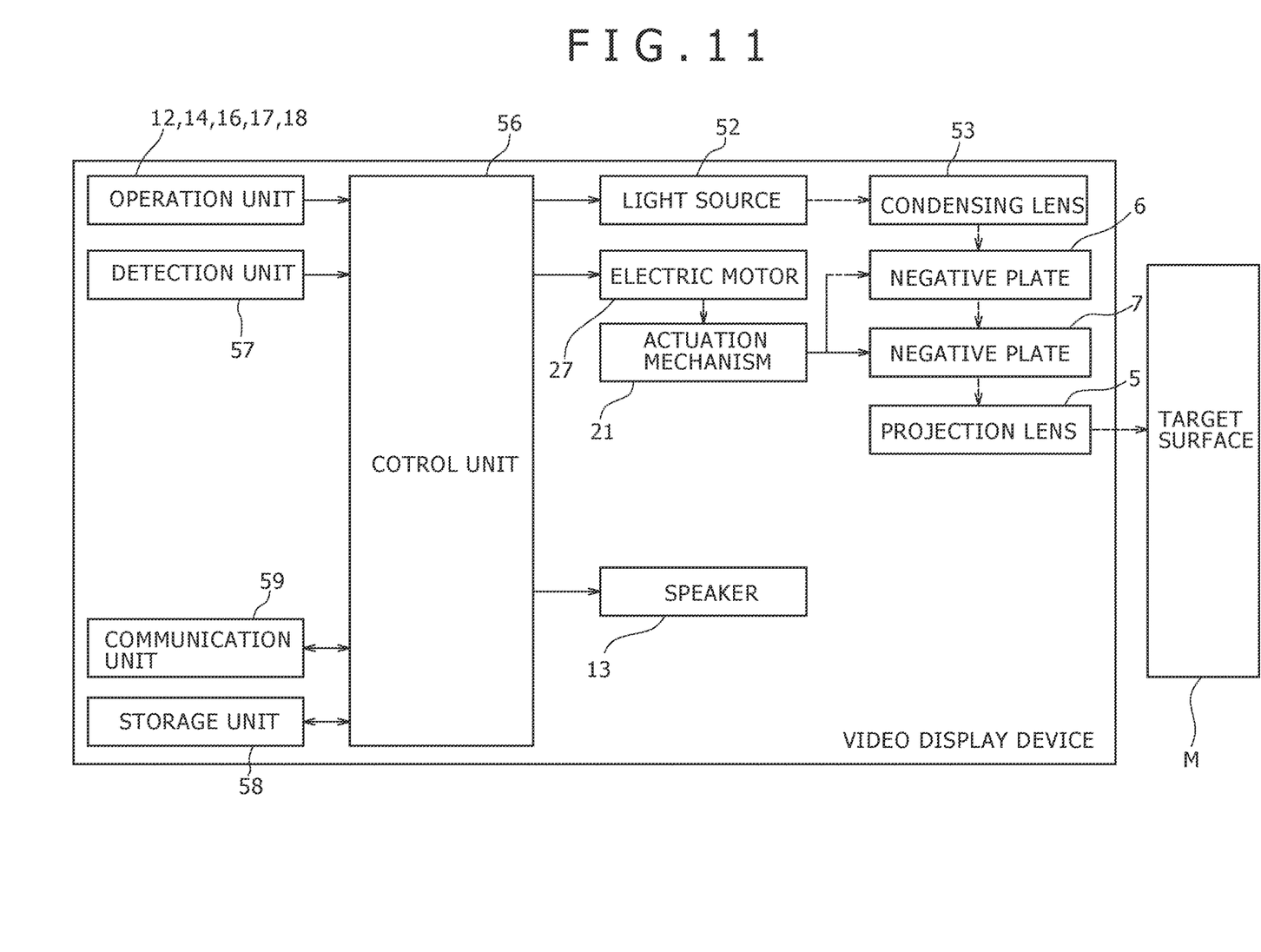
FIG. 11 is a block diagram showing a video display device structure of the present invention.

FIG. 11 is a block diagram showing a video display device structure according to the present invention. As shown in FIGS. 4 and 11, a light source 52 is installed inside the casing 1 in a location right beneath a part formed with the recessed part 23 of the tray body 22 when in a stored state, such that a light radiation direction of the light source is directed toward the axial direction of the radiation hole 3 (specifically, toward a direction in which the radiation direction is directed right upward when the casing 1 is being switched to its basic position). The light from the light source 52 is radiated toward the target surface M on the outside of the casing 1 through the processes of being condensed by a condensing lens 53, then being guided to the vertically-stacked two negative plates 6 and 7 after passage through the exposure hole 23a, then penetrating (or passing through) these negative plates 6 and 7, and then being introduced into the radiation hole 3 to penetrate the projection lens 5, thereby allowing the starry sky images corresponding to the two negative plates 6 and 7 to be displayed on the target surface M.

By the way, not the whole part but only a part of each expression area 48 of the negative plates 6 and 7 forms a projected part situated in the range of the exposure hole 23a as viewed from the bottom, and this projected part is projected onto the target surface M. Then, the projected part is rotationally moved with its center as the fulcrum in accordance with the rotation of the negative plates 6 and 7, thereby allowing the appearance or not of the stars in the starry sky to be expressed together with the movement of the stars therein.

When performing projection of the starry sky image with the above structure, it can be considered that rotation control of the upper and lower negative plates 6 and 7 is of importance, and accordingly, a control unit 56 constituted of a microcomputer or like components shall be applied to such rotation control.

To the input side of the control unit 56 are connected the above various operation units 12, 14, 16, 17 and 18 and various detection units 57 such as a rotation sensor that detects each rotational position of the upper and lower negative plates 6 and 7, while to the output side thereof are connected the light source 52, the electric motor 27 and the speaker 13. Besides, the control unit 56 has, in an input/output processable manner, a storage unit 58 with various information such as sound data stored therein, and a communication unit 59 that performs communication with an external apparatus.

The control unit 56 executes appropriate control so as to obtain the control contents as described the above, in such a way as to output electric output signals to the light source 52, the electric motor 27 and the speaker 13 on the output side of the control unit, in response to electric input signals sent from the operation units 12, 14, 16, 17 and 18 on the input side thereof. When a given sound is selected by the pushing operation of the three operation buttons 12, 12 and 12, for instance, the control unit acquires the selected sound data from the storage unit 58, or alternatively, from the external apparatus via the communication unit 59, followed by outputting the acquired sound data from the speaker 13.

Further, the control unit 56 is structured so as to control both of the rotational speed and the rotation direction of an output shaft of the electric motor 27. Specifically, the control unit 56 executes control of the rotational speed and/or rotation direction of the output shaft of the electric motor 27 through the processing such as duty-ratio adjustment by Pulse Width Modulation control, output signal voltage value adjustment by a Digital-to-Analog converter etc., and switching as to the presence or not of the output signal.

It will be appreciated that with the video display device having the above structure, an actual starry sky can be reproduced more realistically.

It is to be noted that the storage unit may be internally installed in the control unit 56. It is to be also noted that the light source 52 may be turned on/off completely in linkage with on/off operation of the power switch 19, because the processing of executing on/off control of the light source 52 by the control unit 56 is not a required step. In this case, any need to connect the light source 52 to the output side of the control unit 56 is eliminated.

In the above embodiment, the twinkling negative plate 6 is arranged between the light source 52 situated right beneath the stellar negative plate 7 and the stellar negative plate 7, in which case, however, the vertical positional relation therebetween may be inverted. Specifically, provided that the lower negative plate 6 shall be the stellar negative plate, while the upper negative plate 7 shall be the twinkling negative plate, the twinkling negative plate 6 may be arranged between the projection lens 5 situated right above the stellar negative plate 7 and the stellar negative plate 7.

Moreover, in the above embodiment, the actuation mechanism 21 is structured so as to drive the twinkling negative plate 6 and the stellar negative plate 7 in the same rotation direction, in which case, however, this actuation mechanism 21 may be structured so as to drive the twinkling negative plate 6 and the stellar negative plate 7 in mutually different rotation directions.

EXPLANATION OF REFERENCE NUMERALS

1: Casing
5: Projection lens
6, 7: Stellar negative plate (Starry-sky projection negative plate, negative plate)
6, 7: Twinkling negative plate (Negative plate)
8: Placing tray (Support member)
21: Actuation mechanism
23: Recessed part (Starry-sky-end support unit, Twinkling-end support unit)
26: Driving roller (Starry-sky-end rotation driving unit, Twinkling-end rotation driving unit)
27: Electric motor (Actuator)
36: Driving roller (Twinkling-end rotation driving unit, Starry-sky-end rotation driving unit)
38: Transmission mechanism
52: Light source
M: Target surface
Z: Rotation axis

The invention claimed is:

1. A video display device that projects and displays video including starry sky images corresponding to a starry-sky projection negative plate onto a target surface by radiation of light having penetrated said starry-sky projection negative plate onto said target surface via a projection lens, and that comprises:
    a light source,
    said projection lens,
    said starry-sky projection negative plate,
    a twinkling negative plate with uneven light-transmitting properties,
    a starry-sky-end support unit that supports said starry-sky projection negative plate in a location onto which light from said light source is radiated,
    a twinkling-end support unit that supports said twinkling negative plate between said starry-sky projection negative plate and said projection lens or between said light source and said starry-sky projection negative plate, and
    an actuation mechanism that includes an actuator, and rotationally actuates, by power from said actuator, said starry-sky projection negative plate in a state of being supported by said starry-sky-end support unit and said twinkling negative plate in a state of being supported by said twinkling-end support unit,
    wherein said video display device has a single support member formed with said starry-sky-end support unit and said twinkling-end support unit, and
    wherein said support member is in the form of a placing tray that positions, places and supports said starry-sky projection negative plate and said twinkling negative plate.

2. The video display device according to claim 1, wherein said placing tray is structured so as to place said starry-sky projection negative plate and said twinkling negative plate in a stacked state to be in contact with or adjacent to each other.

3. The video display device according to claim 1, wherein said video display device has a casing with said light source and said actuation mechanism housed therein, and wherein said placing tray is stored in said casing in an extractable manner.

4. The video display device according to claim 1, wherein said actuation mechanism has a single actuator and a transmission mechanism that transmits power from said actuator, and wherein a starry-sky-end rotation driving unit that rotationally drives said starry-sky projection negative plate and a twinkling-end rotation driving unit that rotationally drives said twinkling negative plate are individually provided on a power transmission path in said transmission mechanism.

5. The video display device according to claim 1, wherein said actuation mechanism is structured so as to rotate said starry-sky projection negative plate and said twinkling negative plate at mutually different angular velocities or in mutually different directions.

6. The video display device according to claim 1, wherein said actuation mechanism is structured so that a rotation axis of said twinkling negative plate is positioned on the same axis as that of said starry-sky projection negative plate.

* * * * *